United States Patent
Merchant et al.

(10) Patent No.: US 9,771,865 B2
(45) Date of Patent: Sep. 26, 2017

(54) INLET BLEED HEAT MANIFOLD INCLUDING ACOUSTICALLY TREATED FEED PIPE

(71) Applicant: General Electric Company, Schenectady, NY (US)

(72) Inventors: Laxmikant Merchant, Bangalore (IN); Richard Lynn Loud, Ballston Spa, NY (US); Valery Ivanovich Ponyavin, Greenville, SC (US); Dinesh Venugopal Setty, Bangalore (IN); Hua Zhang, Greenville, SC (US)

(73) Assignee: General Electric Company, Schenectady, NY (US)

( * ) Notice: Subject to any disclaimer, the term of this patent is extended or adjusted under 35 U.S.C. 154(b) by 401 days.

(21) Appl. No.: 14/525,494

(22) Filed: Oct. 28, 2014

(65) Prior Publication Data
US 2016/0115870 A1   Apr. 28, 2016

(51) Int. Cl.
*F02C 7/045* (2006.01)
*F02C 7/057* (2006.01)
*F02C 6/08* (2006.01)

(52) U.S. Cl.
CPC ............. *F02C 7/045* (2013.01); *F02C 7/057* (2013.01); *F02C 6/08* (2013.01)

(58) Field of Classification Search
CPC .. F02C 1/08; F02C 7/045; F02C 7/047; F02C 7/08; F02C 7/24; F02C 6/08; F02C 9/18; B64D 2033/0206; B64D 2033/0233
See application file for complete search history.

(56) References Cited

U.S. PATENT DOCUMENTS

| | | | |
|---|---|---|---|
| 4,050,237 A * | 9/1977 | Pall | B01D 39/1676 55/385.4 |
| 5,560,195 A * | 10/1996 | Anderson | F02C 7/08 417/80 |
| 8,272,222 B2 | 9/2012 | Zhang et al. | |
| 8,511,096 B1 * | 8/2013 | Haugen | F02K 1/34 181/213 |
| 2004/0256174 A1* | 12/2004 | Friou | F02C 7/045 181/258 |
| 2010/0037777 A1* | 2/2010 | Davis | B01D 53/30 96/228 |
| 2010/0232945 A1* | 9/2010 | Zhang | F01D 25/10 415/177 |

* cited by examiner

*Primary Examiner* — William H Rodriguez
*Assistant Examiner* — William Breazeal
(74) *Attorney, Agent, or Firm* — Ernest G. Cusick; Hoffman Warnick LLC

(57) ABSTRACT

An inlet bleed heat (IBH) system manifold for a compressor inlet housing is provided. The manifold includes: a plurality of feed pipes for delivering a compressor discharge air, each feed pipe extending across a duct of the compressor inlet housing. Each feed pipe includes: an elongated inner feed pipe for delivering the compressor discharge air, the inner feed pipe including a plurality of orifices along at least a portion of a length of the inner feed pipe, each orifice extending through a wall of the inner feed pipe allowing the compressor discharge air to exit the inner feed pipe; and a noise attenuating material disposed about the inner feed pipe and the plurality of orifices, the noise attenuating material configured to attenuate noise created by the compressor discharge air exiting the plurality of orifices.

15 Claims, 4 Drawing Sheets

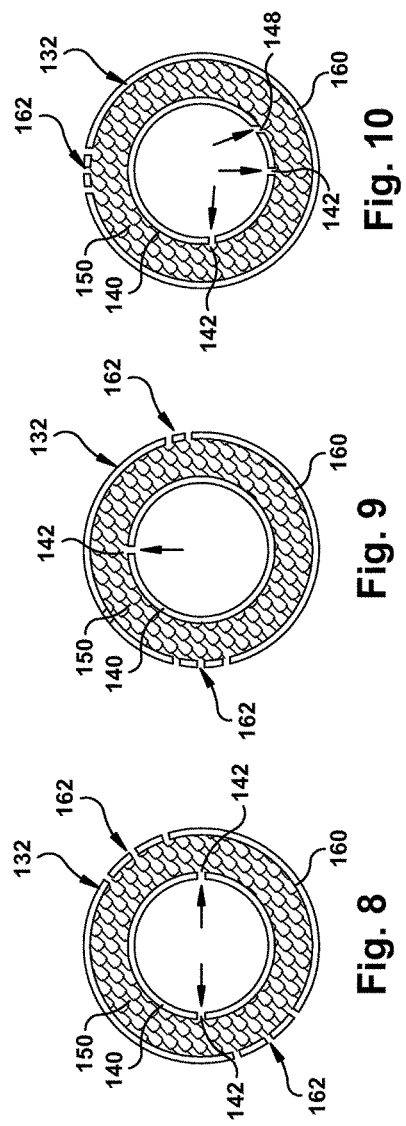

# US 9,771,865 B2

INLET BLEED HEAT MANIFOLD INCLUDING ACOUSTICALLY TREATED FEED PIPE

BACKGROUND OF THE INVENTION

The disclosure relates to noise reduction in a gas turbine and, more particularly, to the use of an acoustically treated feed pipe in an inlet bleed heat manifold for a gas turbine.

The combustion system of a gas turbine generates hot gases to drive a turbine. The turbine, in turn, drives a compressor that provides compressed air for combustion in the combustion system. The turbine produces usable output power. In some gas turbine applications, there are instances of gas turbine plant operation where the gas turbine pressure ratio reaches the operating pressure ratio limit of the compressor, resulting in compressor surge. These instances may arise in applications where low energy fuels or any other fuels with large amounts of diluent injection are used and/or at cold ambient temperature conditions. The compressor pressure ratio is typically larger than the turbine pressure ratio in that the latter is subject to pressure loss in the turbine combustor.

One solution that has been used to provide compressor pressure ratio protection is the bleeding off of gas turbine compressor discharge air and re-circulating the bleed air back to the compressor inlet. This method of gas turbine operation, known as inlet bleed heat (IBH) control, raises the inlet temperature of the compressor inlet air by mixing the bleed portion of the hot compressor discharge air with the colder ambient air, thereby reducing the air density and the mass flow to the gas turbine.

When a gas turbine bleeds compressor air into the inlet duct, it creates noise that can exceed noise limits. In one IBH system, a number of supply feed pipes with a number of orifices along their length are positioned across the inlet duct to deliver the bleed flow. In this setting, the compressed airflow exiting the orifices creates a loud sonic jet. In order to attenuate the noise generated by the sonic jets issuing out of the IBH feed pipes, the supply feed pipes are located downstream but as close as possible to an inlet silencer within the inlet housing, and upstream as far as possible from the compressor inlet. This positioning is also oftentimes required to attain required thermal mixing of the bleed flow with the inlet airflow to meet system parameters at the compressor inlet. The particular IBH system requires positioning that limits the allowable configurations for the IBH system and the inlet housing.

In another IBH system, an array of supply feed pipes with certain feed pipes having orifices along their length is provided. Each orifice is provided with an acoustically treated nozzle that extends perpendicular to the feed pipe. Each acoustically treated nozzle includes a port coupled to a respective orifice on the supply feed pipe, a metal-mesh containing container in fluid communication with the port and an outlet from the container having various openings through which the bleed flow may pass radially outward in a subsonic state. The metal mesh acts to attenuate noise such that the IBH system can be positioned upstream of the inlet silencer. While these nozzles act to mitigate the noise, they are costly and complicated. For example, an IBH system may require a large number of supply feed pipes and include hundreds of nozzles along the array of supply feed pipes with each orifice requiring an acoustically treated nozzle. Consequently, installation and/or repair can be time consuming and costly. In addition, this particular IBH system also requires positioning that limits the allowable configurations for the IBH system and the inlet housing.

BRIEF DESCRIPTION OF THE INVENTION

A first aspect of the disclosure provides an inlet bleed heat (IBH) manifold pipe for delivering a compressor discharge air, the inlet bleed heat (IBH) manifold pipe comprising: an elongated inner feed pipe for delivering the compressor discharge air, the inner feed pipe including a plurality of orifices along at least a portion of a length of the inner feed pipe, each orifice extending through a wall of the inner feed pipe allowing the compressor discharge air to exit the inner feed pipe; and a noise attenuating material disposed about the inner feed pipe and the plurality of orifices, the noise attenuating material configured to attenuate noise created by the compressor discharge air exiting the plurality of orifices.

A second aspect of the disclosure provides an inlet bleed heat (IBH) system manifold for a compressor inlet housing, comprising: a plurality of feed pipes for delivering a compressor discharge air, each feed pipe extending across a duct of the compressor inlet housing, and each feed pipe including: an elongated inner feed pipe for delivering the compressor discharge air, the inner feed pipe including a plurality of orifices along at least a portion of a length of the inner feed pipe, each orifice extending through a wall of the inner feed pipe allowing the compressor discharge air to exit the inner feed pipe; and a noise attenuating material disposed about the inner feed pipe and the plurality of orifices, the noise attenuating material configured to attenuate noise created by the compressor discharge air exiting the plurality of orifices.

A third aspect of the disclosure provides an inlet bleed heat (IBH) system for a gas turbine, the IBH system comprising: an inlet filter housing; an inlet silencer disposed downstream of the inlet filter housing; a compressor discharge extraction manifold that extracts compressor discharge air; and an inlet bleed heat (IBH) manifold receiving the compressor discharge air, the IBH manifold including a plurality of acoustically treated feed pipes for delivering the compressor discharge air, each feed pipe including: an elongated inner feed pipe for delivering the compressor discharge air, the inner feed pipe including a plurality of orifices along at least a portion of a length of the inner feed pipe, each orifice extending through a wall of the inner feed pipe allowing the compressor discharge air to exit the inner feed pipe; and a noise attenuating material disposed about the inner feed pipe and the plurality of orifices, the noise attenuating material configured to attenuate noise created by the compressor discharge air exiting the plurality of orifices.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIGS. 6-10 show cross-sectional views of various alternative embodiments of the inlet bleed heat system manifold pipe according to embodiments of the invention.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
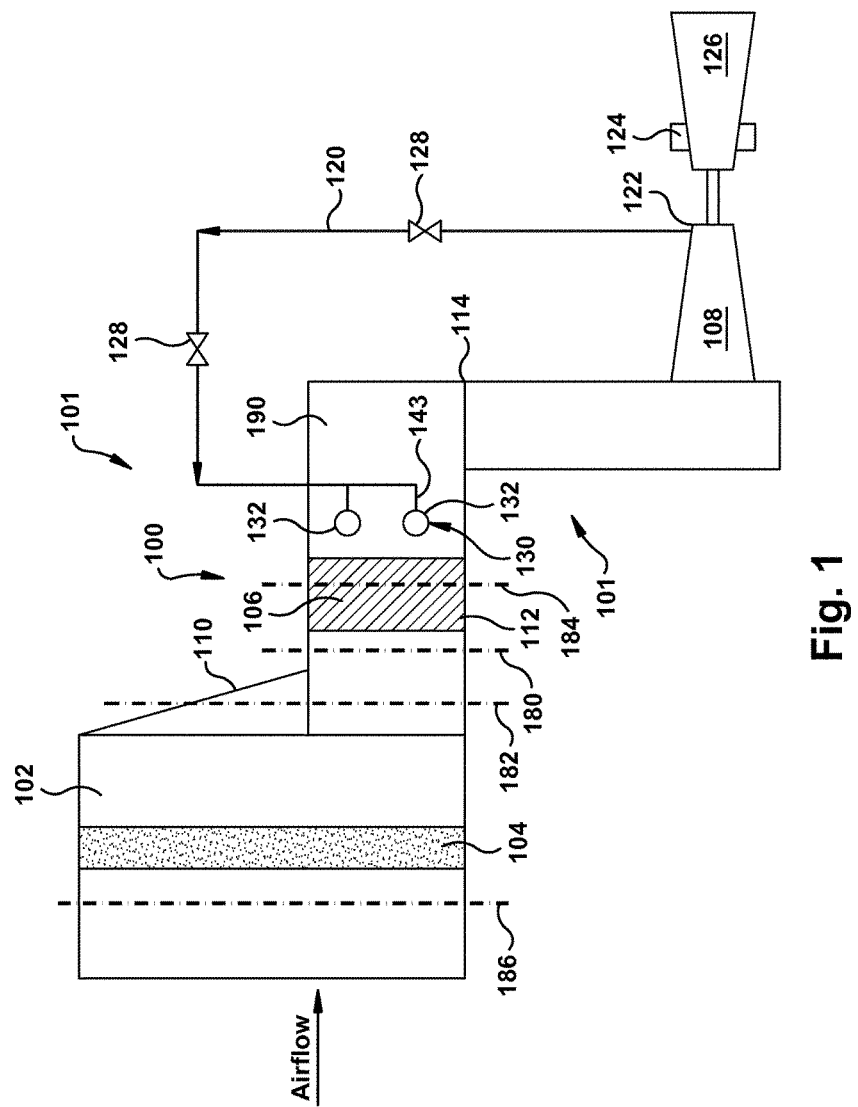
FIG. 1 shows a schematic of an inlet bleed heat system according to embodiments of the invention with a gas turbine system.

Referring to FIG. 1, an inlet bleed heat system 100 is schematically illustrated. Inlet bleed heat (IBH) system 100 may be used to protect the gas turbine compressor from icing when operating at reduced inlet guide vane (IGV) angles. Moreover, IBH systems may be used to reduce compressor pressure ratio at certain operating conditions where additional compressor operating margin is required. As illustrated, IBH system 100 may be part of a compressor inlet housing 101, and may include an inlet filter housing 102, which may include one or more filters 104, and an inlet silencer 106 disposed downstream of the inlet filter housing 102. Compressor 108 draws an airflow into inlet filter housing 102. A transition duct 110 may fluidly couple inlet filter housing 102 to a duct 112 in which inlet silencer 106 is disposed. A duct 114 delivers the airflow after inlet silencer 106 to compressor 108. A compressor discharge extraction manifold 120 extracts compressor discharge air, i.e., from a discharge 122 of compressor 108. In the example shown, compressor 108 feeds compressed air to a combustor 124 for a gas turbine 126. Compressor discharge air may flow through a number of valves 128, such as an isolation valve and a control valve, to an inlet bleed heat manifold 130, which as illustrated is disposed downstream of inlet air filter housing 102 and inlet silencer 106.

In accordance with embodiments of the invention, IBH manifold 130 includes a plurality of acoustically treated feed pipes 132 for delivering the compressor discharge air to a location within compressor inlet housing 101. Each feed pipe 132 is in direct fluid communication with compressor discharge extraction manifold 120, and extends across a duct or other location of compressor inlet housing 101, e.g., duct 112.

Figure 2:
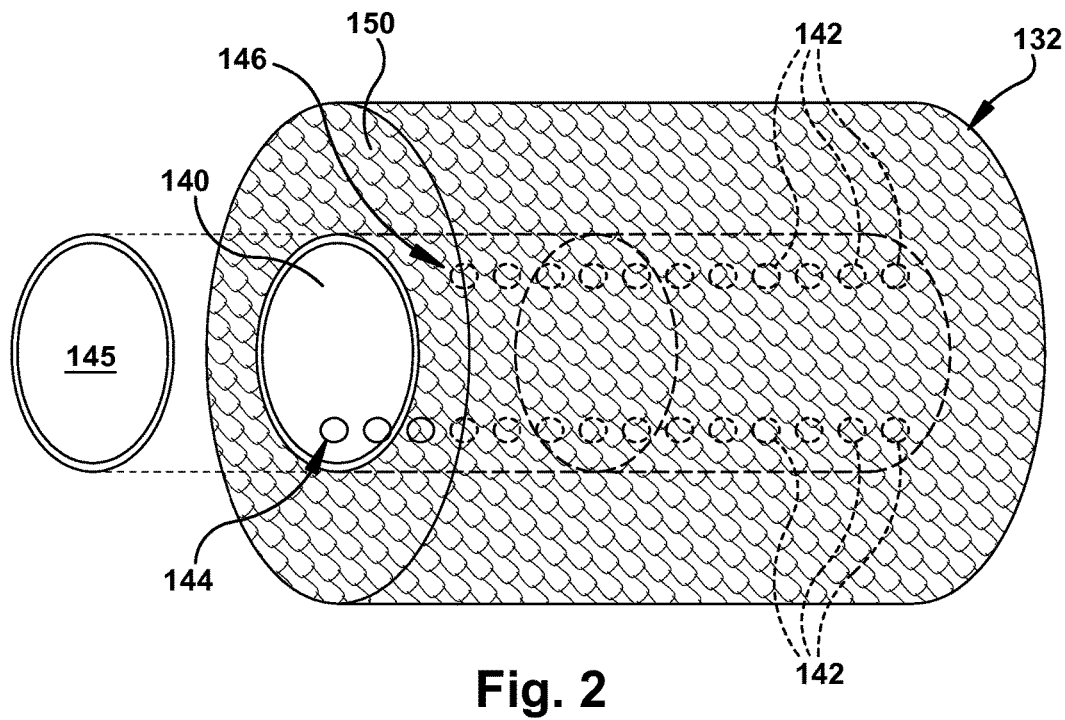
FIG. 2 shows a perspective view of an inlet bleed heat system manifold pipe according to embodiments of the invention.
Figure 3:
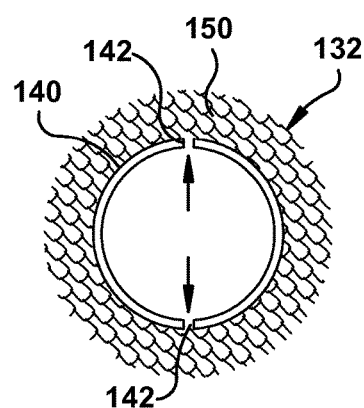
FIG. 3 shows a cross-sectional view of an inlet bleed heat system manifold pipe according to embodiments of the invention.
Figure 4:
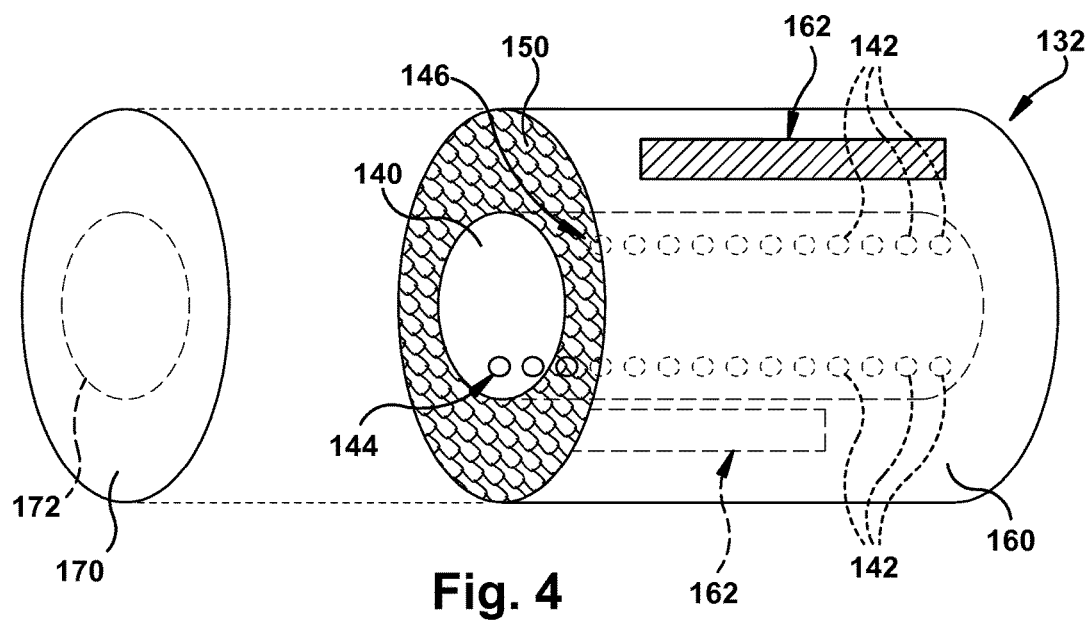
FIG. 4 shows a perspective view of an inlet bleed heat system manifold pipe according to embodiments of the invention.
Figure 5:
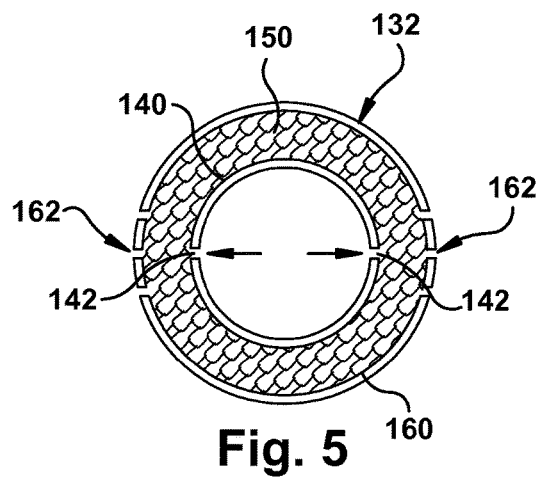
FIG. 5 shows a cross-sectional view of an inlet bleed heat system manifold pipe according to embodiments of the invention.

FIGS. 2 and 4 show perspective views of a number of embodiments of an IBH manifold pipe 132; FIGS. 3 and 5 show a cross-sectional views corresponding to FIGS. 2 and 4, respectively; and FIGS. 5-10 show cross-sectional views of various alternative embodiments. As illustrated in FIGS. 2-10, each feed pipe 132 may include an elongated inner feed pipe 140 for delivering the compressor discharge air. Inner feed pipe 140 may be made of any material capable of withstanding the environment within compressor inlet housing 101, e.g., steel, aluminum, alloy, etc., and may have a diameter in the range of approximately 16 centimeters to approximately 25 centimeters. Inner feed pipe 140 includes a plurality of orifices 142 along at least a portion of a length of the inner feed pipe. Orifices 142 allow compressor discharge air to exit therefrom. Orifices 142 may have a diameter ranging, for example, from approximately 0.30 centimeters to approximately 0.75 centimeters. Consequently, compressor discharge air normally would create a loud noise upon exiting the orifices. In FIGS. 2 and 4, orifices 142 are arranged in a first row of orifices 144 facing a first radial direction and a second row of orifices 146 facing a second, opposite radial direction. However, as will be described, orifices 142 need not be arranged in rows, and need not extend along an entirety of the length of inner feed pipe 140. In any event, each orifice 142 extends through a wall of inner feed pipe 140 allowing the compressor discharge air to exit the inner feed pipe through the orifices. In one embodiment, each orifice extends radially through the wall. However, as shown in FIG. 10, one or more orifices 148 may be directed in a non-radial fashion to direct the compressed discharge air in a non-radial direction from inner feed pipe 140. Orifices 142, 148 may be formed in inner feed pipe 140 in any now known or later developed fashion, e.g., drilling, etc.

With continuing reference to FIGS. 2-5, IBH manifold pipe 132 may also include a noise attenuating material 150 disposed about inner feed pipe 140 and plurality of orifices 142. Noise attenuating material 150 may include any material configured to attenuate noise created by the compressor discharge air exiting orifices 142, and capable of withstanding the environment within compressor inlet housing 101. In one embodiment, noise attenuating material 150 may include a tangled, matted or meshed metal such as but not limited to a metal wire mesh. In the latter example, noise attenuating material may include, for example, a metal wire mesh tape such as but not limited to corrosion-resistant metal gauze (e.g., 304 stainless steel) available from McMaster-Carr, Atlanta, Ga. The metal wire mesh tape may be rolled about inner feed pipe 140 in such a manner as to selectively provide a particular meshed metal density and radial depth. The density and depth may be chosen to accommodate different applications. For example, the metal wire mesh may have a radial depth ranging from approximately 5 centimeters to approximately 16 centimeters. Similarly, the metal wire mesh may have a density ranging from approximately 16 kg/m$^3$ to approximately 50 kg/m$^3$. The density may be substantially radially uniform or vary over the radial depth. With certain embodiments, noise reduction has been observed up to approximately 30 decibels (dB). Other noise attenuating material may also be employed such as steel wool, matted steel shavings, non-tape metal wire mesh, etc. Combinations of the above-identified examples may also be employed, e.g., steel wire mesh with steel wool. Any material used is, ideally, although not necessarily, disposed about inner feed pipe 140 in a manner to ensure even distribution during operation of the compressor.

In one embodiment, shown in FIGS. 2 and 3, noise attenuating material 150 may be used in an exposed fashion such that compressor discharge air simply passes through orifices 142 of inner feed pipe 140 and passes through noise attenuating material 150. As shown in FIG. 1, inner feed pipe 140 is fluidly coupled to compressor discharge extraction manifold 120, e.g., by one or more pipes 143, and by one or both ends of inner feed pipe 140. Referring to FIG. 2, where inner feed pipe 140 is coupled to compressor discharge extraction manifold 120 at only one end (right side) the opposing end (left side) may be closed by an end cap 145. End cap 145 may be made of the same material as listed herein for inner feed pipe 140 or another compatible material, and may be sealingly coupled to inner feed pipe 140 using any now known later developed manner, e.g., welding, fasteners, etc.

Referring to FIGS. 4 and 5, in an alternative embodiment of the invention, IBH manifold pipe 132 may include an outer casing 160 enclosing noise attenuating material 150, e.g., metal wire mesh. In a situation where an end of inner feed pipe 140 is to be closed off, an end cap 170 may enclose the end (left side) of inner feed pipe 140 and outer casing 160 including a space therebetween in which noise attenuating material 150 is disposed. Alternatively, where an end of inner feed pipe 140 is coupled to another pipe such as a pipe 143 (FIG. 1) of compressor discharge extraction manifold 120 or a pipe (not shown) to feed another, downstream IBH manifold pipe 132, end cap 170 may include an opening 172 (shown in phantom) for sealingly surrounding the other pipe, e.g., by welding to the other pipe or through use of other sealing mechanisms. In this case, end cap 170 would sealingly surround the relevant pipe and would be sealingly coupled to outer casing 160 to enclose the space in which noise attenuating material 150 is disposed. Outer casing 160 and end caps 145, 170 may include any material capable of withstanding the environment of the inlet housing, e.g., steel, etc., and may be coupled using any now known later developed manner, e.g., welding, fasteners, etc.

With continuing reference to FIGS. 4 and 5, outer casing 160 also includes a plurality of openings 162 through a wall thereof to allow compressor discharge air to exit the outer casing. "Openings" may take the form of any type of aperture, perforation, etc., through a wall of outer casing 160. In some embodiments, openings 162 may have a cumulative surface area amounting to up to about 15% of the overall surface area of outer casing 160. Plurality of openings 162 are arranged to at least partially cover outer casing 160, such that openings 162 and orifices 142 may be arranged in a number of ways to provide adequate noise attenuation. In FIGS. 4 and 5, orifices 142 are arranged in radially opposing rows 144, 146 (FIG. 4 only) and openings 162 are arranged in a pair of discrete locations on the outer casing (openings shown as shaded/phantom rectangles in perspective of FIG. 4, and as holes/breaks in casing 160 in cross-sections of FIGS. 5-10). In FIG. 5, orifices 142 and openings 162 are arranged in a radially aligned fashion, i.e., at a 0° circumferential offset.

Turning to FIGS. 6-10, alternative arrangements of orifices 142 and openings 162 are illustrated. In FIG. 6, plurality of openings 162 are substantially uniformly spaced about a periphery of outer casing 160 while orifices 142 are positioned in a radially opposing fashion in inner feed pipe 140. FIGS. 4, 5, 7 and 8 illustrate examples in which plurality of openings 162 are positioned in a pair of discrete locations on outer casing 160 (openings shown as shaded/phantom rectangles in perspective of FIG. 4, and as holes/breaks in casing 160 in cross-sections of FIGS. 5-10) that are circumferentially offset from the plurality of orifices 142 by an angle ranging from approximately 0° to approximately 90°. As noted above, FIGS. 4 and 5 show approximately 0° circumferential offset. FIG. 7 shows approximately 90° circumferential offset, and FIG. 8 shows an angle between 0° circumferential offset and 90° circumferential offset, e.g., approximately 45° circumferential offset. FIG. 9 shows an embodiment in which only one row of orifices 142 is employed that are approximately 90° circumferentially offset from two opposing sets of openings 162. FIG. 10 shows an embodiment with more random assortment of orifices 142 and openings 162. It is understood that while particular examples are illustrated, other variants are also possible and considered within the scope of the invention. In another embodiment, orifices 142 and openings 162 may also be axially displaced. That is, orifices 142 may be positioned at a first axial location on inner feed pipe 140 and openings 162 may be positioned on outer casing 160 at a second axial location distanced axially from the first axial location. In other words, orifices 142 and openings 162 would not be radially aligned or overlap, causing compressor discharge air to travel lengthwise within noise attenuating material 150 before exiting outer casing 160.

Returning to FIG. 1, in accordance with another embodiment, an inlet bleed heat (IBH) system manifold 130 may be provided for compressor inlet housing 101. IBH system manifold 130 includes a plurality of feed pipes 132, as described herein, for delivering a compressor discharge air. Each feed pipe 132 extends across a location in compressor inlet housing 101. IBH manifold 100 including noise attenuating pipes 132 provides a number of advantages. For example, in contrast to conventional systems, pipes 132 do not include nozzles that extend perpendicularly therefrom that must be replaced and maintained at great expense. The removal of the nozzles also reduces the size of the IBH manifold.

Due to the noise reduction provided, IBH manifold 100 may be positioned in a number of locations not previously advisable. In one embodiment, IBH manifold 100 may be positioned upstream of inlet silencer 106. For example, as shown in FIG. 1, IBH manifold 100 may be positioned either in an extension of duct 112 prior to inlet silencer 106 at line 180, or in a transition duct 110 at line 182. In another embodiment, where inlet silencer 106 includes a plurality of stages, IBH manifold 100 may be positioned between a pair of the stages of the inlet silencer, e.g., at line 184 in FIG. 1. In another alternative, due to the noise reduction and reduced size, IBH manifold 100 may be positioned upstream of inlet filter housing 102, i.e., as shown in FIG. 1 at line 186. In this setting, IBH manifold 100 may additionally act as a low cost de-icing system in environments where that is required. In addition, the reduced size of manifold 100 may allow reduction of the necessary horizontal ducting in compressor inlet housing 100, e.g., by 1-2 meters. For example, IBH manifold 100 may allow inlet silencer 106 and IBH manifold 100 to be placed in an elbow duct 190, removing the need for dedicated horizontal duct 112. IBH manifold 100 may also allow use in a compact side inlet setting.

As understood, the number of IBH manifold feed pipes 132 that are necessary for a particular application may vary depending on a number of factors such as but not limited to: desired airflow temperature and pressure, mixing limitations, duct size, compressor size, compressor discharge air temperature and pressure, etc. Accordingly, although two feed pipes 132 are illustrated in FIG. 1 for IBH manifold 100, any number of pipes may be used, including just one. In any event, fewer number of pipes 132 may be employed compared to conventional acoustic treated nozzle arrangements. In particular, IBH manifold 100 provides improved compressor discharge air mixing due to increased mixing length (over length of pipes 132) and, where positioned upstream of an inlet silencer 106, higher turbulence in the downstream of inlet silencer 106. Feed pipes 132 may extend within the selected duct, e.g., 112, in a manner other than horizontally as illustrated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An inlet bleed heat (IBH) manifold pipe for delivering a compressor discharge aft from a compressor of a gas turbine engine, the inlet bleed heat (IBH) manifold pipe comprising:
    an elongated inner feed pipe that receives the compressor discharge air from the compressor, the elongated inner feed pipe including a plurality of orifices along at least a portion of a length of the elongated inner feed pipe, each orifice of the plurality of orifices extending through a wall of the elongated inner feed pipe allowing the compressor discharge air to exit the elongated inner feed pipe;
    a noise attenuating material enclosing the elongated inner feed pipe and the plurality of orifices, the noise attenuating material configured to receive the compressor discharge air from the plurality of orifices and to attenuate noise created by the compressor discharge air exiting the plurality of orifices; and
    an outer casing enclosing the noise attenuating material, the outer casing including a plurality of openings through a wall of the outer casing and along at least a portion of a length of the outer casing, each opening of the plurality of openings being circumferentially misaligned with each orifice of the plurality of orifices, wherein the plurality of openings are configured to receive the compressor discharge air from the noise attenuating material and to discharge the compressor discharge aft into an inlet of the gas turbine engine.

2. The inlet bleed heat (IBH) manifold pipe of claim 1, wherein the noise attenuating material includes a tangled, matted or meshed metal.

3. The inlet bleed heat (IBH) manifold pipe of claim 1, wherein the plurality of orifices include a first row of orifices facing a first radial direction and a second row of orifices facing a second, opposite radial direction.

4. An inlet bleed heat (IBH) system manifold for a compressor inlet housing, comprising:
    an elongated inner feed pipe that receives a compressor discharge air from a compressor of a gas turbine engine, the elongated inner feed pipe including a plurality of orifices along at least a portion of a length of the elongated inner feed pipe, each orifice of the plurality of orifices extending through a wall of the elongated inner feed pipe allowing the compressor discharge air to exit the elongated inner feed pipe;
    a noise attenuating material enclosing the elongated inner feed pipe and the plurality of orifices, the noise attenuating material configured to receive the compressor discharge aft from the plurality of orifices and to attenuate noise created by the compressor discharge air exiting the plurality of orifices; and
    an outer casing enclosing the noise attenuating material, the outer casing including a plurality of openings through a wall of the outer casing and along at least a portion of a length of the outer casing, each opening of the plurality of openings being circumferentially misaligned with each orifice of the plurality of orifices, wherein the plurality of openings are configured to receive the compressor discharge air from the noise attenuating material and to discharge the compressor discharge air into the compressor inlet housing.

5. The IBH system manifold of claim 4, wherein the noise attenuating material includes a tangled, matted or meshed metal.

6. The IBH system manifold of claim 5, wherein the noise attenuating material includes a metal wire mesh.

7. The IBH system manifold of claim 6, wherein the metal wire mesh has a radial depth of 5 centimeters to 16 centimeters.

8. The IBH system manifold of claim 4, wherein the plurality of openings are uniformly spaced about a periphery of the outer casing.

9. The IBH system manifold of claim 4, wherein the plurality of openings are positioned in a pair of discrete locations on the outer casing that are circumferentially offset from the plurality of orifices by an angle ranging from 5° to 90°.

10. The IBH system manifold of claim 4, wherein the plurality of orifices include a first row of orifices facing a first radial direction and a second row of orifices facing a second, opposite radial direction.

11. An inlet bleed heat (IBH) system for a gas turbine engine, the IBH system comprising:
    an inlet filter housing;
    an inlet silencer disposed downstream of the inlet filter housing; a compressor discharge extraction manifold that extracts compressor discharge air; and an inlet bleed heat (IBH) manifold receiving the compressor discharge air, the IBH manifold including a plurality of acoustically treated feed pipes for delivering the compressor discharge air, each feed pipe of the plurality of acoustically treated feed pipes including:
    an elongated inner feed pipe that receives the compressor discharge air from a compressor of the gas turbine engine, the elongated inner feed pipe including a plurality of orifices along at least a portion of a length of the elongated inner feed pipe, each orifice of the plurality of orifices extending through a wall of the elongated inner feed pipe allowing the compressor discharge air to exit the elongated inner feed pipe;
    a noise attenuating material enclosing the elongated inner feed pipe and the plurality of orifices, the noise attenuating material configured to receive the compressor discharge air from the plurality of orifices and to attenuate noise created by the compressor discharge air exiting the plurality of orifices; and
    an outer casing enclosing the noise attenuating material, the outer casing including a plurality of openings through a wall of the outer casing and along at least a portion of a length of the outer casing, each opening of the plurality of openings being circumferentially misaligned with each orifice of the plurality of orifices, wherein the plurality of openings are configured to receive the compressor discharge air from the noise attenuating material and to discharge the compressor discharge air into an inlet of the gas turbine engine.

12. The IBH system of claim 11, wherein the IBH manifold is positioned upstream of the inlet silencer.

13. The IBH system of claim 11, wherein the inlet silencer includes a plurality of stages, and wherein the IBH manifold is positioned between a pair of stages of the plurality of stages of the inlet silencer.

14. The IBH system of claim 11, wherein the IBH manifold is positioned upstream of the inlet filter housing.

15. The IBH system of claim 11, further comprising a transition duct disposed downstream of the inlet filter housing, wherein the IBH manifold is disposed within the transition duct.

* * * * *